May 21, 1957 W. W. CRISSINGER 2,793,265
METHODS OF AND MEANS FOR EFFECTING MAGNETIC ARMATURE ACTUATION
Filed Feb. 25, 1952 3 Sheets-Sheet 1
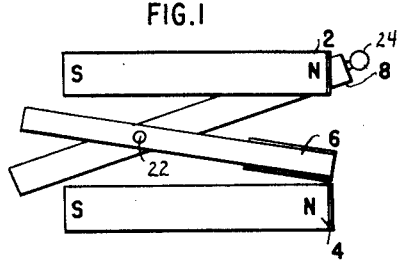
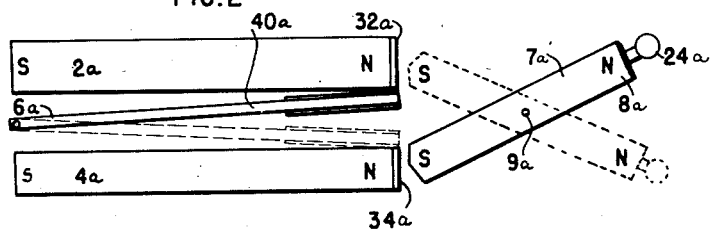
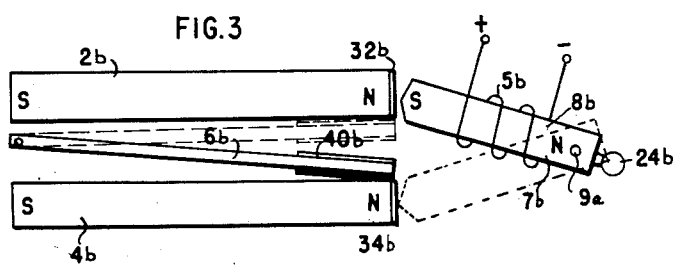
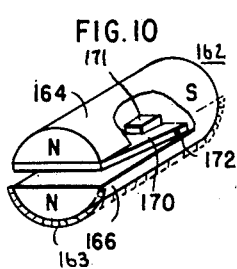
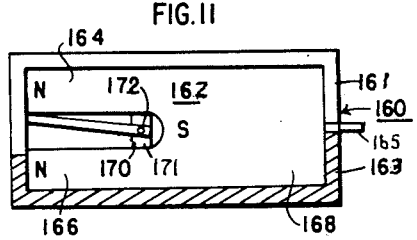
INVENTOR.
WOODROW W. CRISSINGER
BY Brown, Jackson,
Boettcher & Dienner
ATTYS.

May 21, 1957  W. W. CRISSINGER  2,793,265
METHODS OF AND MEANS FOR EFFECTING MAGNETIC ARMATURE ACTUATION
Filed Feb. 25, 1952  3 Sheets-Sheet 2

INVENTOR.
WOODROW W. CRISSINGER
BY Brown, Jackson,
Boettcher & Dienner
ATTYS.

May 21, 1957 W. W. CRISSINGER 2,793,265
METHODS OF AND MEANS FOR EFFECTING MAGNETIC ARMATURE ACTUATION
Filed Feb. 25, 1952 3 Sheets-Sheet 3
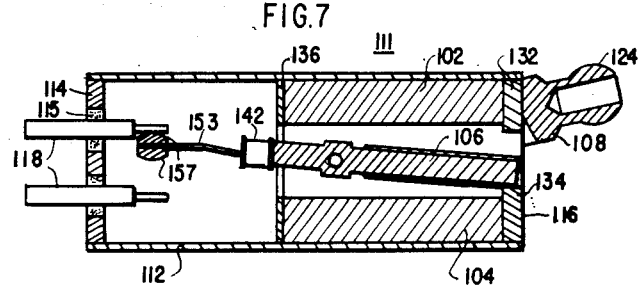
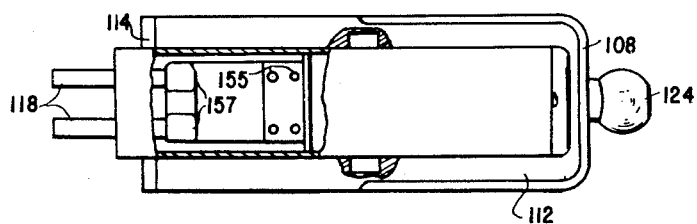
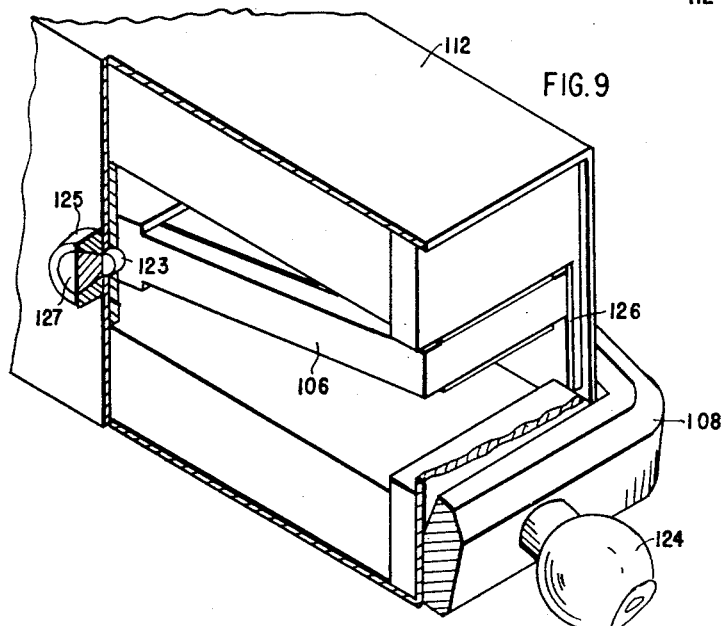
INVENTOR.
WOODROW W. CRISSINGER
BY Brown, Jackson,
Boettcher & Diemer
ATTYS.

United States Patent Office 2,793,265
Patented May 21, 1957

2,793,265
METHODS OF AND MEANS FOR EFFECTING MAGNETIC ARMATURE ACTUATION

Woodrow W. Crissinger, Galion, Ohio, assignor to North Electric Company, a corporation of Ohio Application February 25, 1952, Serial No. 273,296

14 Claims. (Cl. 200—87)

The present invention relates in general to novel methods of, and magnetic means for, effecting armature actuation; and more specifically to various new and novel switch members utilizing these novel armature actuating means and methods.

Most known electrical systems today include switch members for effecting circuit closing and circuit interrupting functions, the switches comprising basically a movable armature member which controls operation of associated contacts to open and close the desired circuits. In that the use of electrical systems for control and other purposes has become extremely widespread in the field, severe operating demands are frequently made of the switch members which form an integral part thereof.

A few of the adverse operating conditions which are encountered by a switch in an actual field application are exemplified by the switch members as used in aircraft and other free-flight equipment. In such application the circuit controlling contacts of the switch must, in the interest of safe reliable operation, be able to withstand the wear factors which are encountered in normal use, plus shock and vibration forces of excessive values, the deteriorating effects of corrosive atmospheres, temperature variations over extremely large ranges, and extreme variations of atmospheric pressures. Each of these factors is individually instrumental in reducing the life of a switch member. For example, as a result of the lower atmospheric pressures at high altitudes, operation of a switch member to open or close current-carrying contacts is accompanied by arcing which causes severe pitting and oxidation of the contact members. Conventional switches operating under such conditions are normally of short life and frequently switch replacement is required. Each of the other mentioned environments have a similar undesirable effect on the life of the switch and provide definite problems in the aeronautic field.

In other applications, as for example, in manufacturing plants in which explosive gases are dangerously present, the problem of preventing the arc which normally occurs with the opening or closing of the switch contacts from setting off a serious explosion is a very definite problem.

In still other fields, maintaining the contacts in the closed condition during periods of shock and acceleration force application is a particularly difficult problem, this being especially true in the case of contacts which are operated by electrically controlled members such as relays.

These are only a few of the problems which are raised in the various fields in which known conventional switching equipment is used. While certain types of hermetically sealed switches have been developed for the purpose of solving these problems, the armature actuating structures which have been used therein have been such as to materially reduce the life of the switch and to render the use thereof extremely expensive and impractical. It is a primary object of this invention to set forth hereinafter an armature actuating means of a practical and economical structure which inherently grants to switches using such means a definite increase in its life expectancy and a definite solution to these, and to many other problems, which have been so long existent in the art.

A specific object of the invention is to provide various switch embodiments including the novel armature actuating means and methods which are rendered particularly practical by reason of the structural simplicity of the switch, the snap action characteristic of the armature in effecting a control operation, the inherent switch operating stability, and the minimum number of working parts in the switch which are subject to wear. These and many other operating and structural features of the armature actuating means and switch are to be found in the specific details as set forth in the following description and drawings in which:

Figure 1 illustrates the basic elements of armature actuating means utilizing an external shunt actuator as an armature mover;

Figure 2 illustrates the novel armature actuator means utilizing a permanent magnet actuator;

Figure 3 illustrates the armature actuator means utilizing an electromagnetic actuator;

Figure 4:
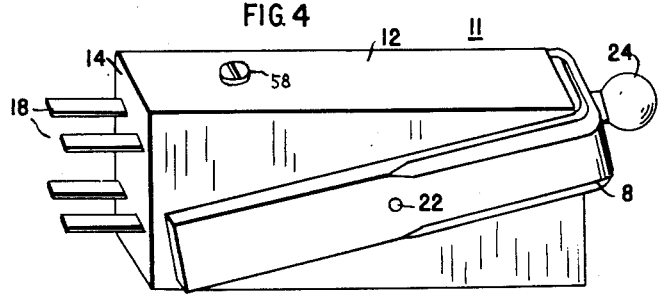
Figure 4 illustrates in perspective a toggle switch including the armature actuating arrangement of Figure 1.

Figures 7, 8 and 9, inclusive, illustrate respectively a magnetic toggle switch adapted for hermetic sealing including the actuator means of Figure 1; and Figures 10 and 11 illustrate a cylindrical switch utilizing the novel armature actuator means of Figure 1.

Other specific switch embodiments are set forth in my copending applications which were filed on April 7, 1953, December 4, 1953, and April 14, 1953, and which were respectively assigned Serial Nos. 347,193, 396,127 and 348,759 and which have been assigned to the assignee of this invention.

The basic invention comprises a new and novel means for, and method of, actuating armature members in the control of associated contact members. The arrangement is shown in its simplest forms in Figure 1, and as there illustrated, a magnetic armature 6 pivotally mounted between a first permanent magnet 2 and a second permanent magnet 4 for operation between two given stable positions, the outer armature end being adjacent the lower pole piece 34 in one stable position and adjacent the upper pole piece 32 in the other stable position. The static field of the permanent magnet means 2 or 4 which it is adjacent securely holds the magnetic armature 6 in its assumed position.

The actuator means 8 for effecting movement of the armature between the two stable positions basically comprises a magnetic member which is physically unattached to the armature and which is mounted for operation between two given stable conditions. As shown in Figure 1, the outer end of the actuator 8 in one stable position rests adjacent the outer face of the upper magnet 2 and in a second stable position rests adjacent the outer face of lower magnet 4.

Armature actuation from a given stable position to another predetermined stable position is effected by reducing to the release point the magnetic field of the permanent magnet means which is effectively holding the armature to allow the other permanent magnet to attract the armature to a position adjacent thereto.

In brief detail, with movement of the actuator 8 to one of its stable positions adjacent a magnet end, armature 6 is automatically responsively snapped to the stable position in which its outward end rests adjacent the magnet other than that which the end of the actuator now abuts. Both the actuator and armature, as moved into their new positions, are securely held thereat by the particular magnetic attraction members which are adjacent thereto. Movement of the actuator back to its former stable position will again cause the armature to snap back to its former stable position, the armature 6 moving to a point adjacent the magnet other than that upon which the actuator 8 rests.

Actuation between the two positions in this manner is referred to hereinafter as a bilateral magnetic traction arrangement in that the forces affecting movement of the armature in both directions are magnetically supplied forces and is effected in the following manner.

Assuming first the actuator 8 in the stable position in which its outer end lies adjacent the upper pole magnet 2 and the armature member 6 in the stable position in which its lower outer end rests against lower magnet 4, a firm stable position is obviously provided for each member. That is, actuator 8 provides a high permeability return path for flux emanating from the upper magnet 2 and the actuator is accordingly firmly held in that position. In the same manner the armature 6 provides a high permeability return path for flux emanating from the lower magnet and is firmly held adjacent the lower magnet 4. The flux distribution through the leakage flux return path at the back ends of the magnets exert negligible rotational movement upon the actuator 8 and the armature 6, the distribution of flux at the outward ends of the magnets being the primary factor in effecting rotation of the armature 6 about its axis.

As magnetic actuator 8 is now manually displaced from its position adjacent the upper magnet 2 toward the lower magnet 4, the flux distribution alters so that more and more flux from the upper magnet 2 threads armature 6, while simultaneously the flux threading the armature 6 from the lower magnet 4 is being reduced by the fact that the actuator 8 is providing a lower permeability return path for the flux emanating from the end of the lower magnet 4. As the magnetic actuator 8 approaches the lower magnet 4, the flux distribution is gradually shifted to a point where the upper magnet 2 exerts a greater tractive force on the armature 6 than the lower magnet 4 whereupon a very speedy transfer of the armature from its position adjacent the lower magnet 4 to its position adjacent the upper magnet 2 is effected, such movement having a snap action characteristic due to the greater than linear build up of the actuating force on the armature 6 for each progressive increment of its motion toward its other stable position.

One form of armature actuator means 8 set forth in Figure 1 comprises an external magnetic shunt member which is movable to alternative positions adjacent the magnets ends to modify the geometry of the force fields and thereby permit the snap action movement of the associated armature by the opposite magnet. The second embodiment shown in Figure 2 illustrates the use of an external permanent magnet 8a as the actuator member, and a third embodiment shown in Figure 3 teaches the use of an external electromagnet 8b as the armature actuator member. The operating principles are similar to that briefly described above and will be set forth more fully hereinafter.

In that the armature actuator 8, 8a and 8b of each embodiment are physically unattached to the movable armatures 6, 6a and 6b respectively, the static field producing means, the armature and the associated contact structures to be operated thereby may be mounted within a hermetically sealed housing, and the armature actuator means may be mounted outside the confines of the housing. With such structure the operating elements, which are normally the cause of shortened switch life, are protected from the adverse effects of unusual operating environment and a longer switch life is insured. Switches of this structure will withstand shock and acceleration forces in the order of 50 gravities for a 10 millisecond period, during 3 milliseconds of which the force exceeds 50 gravities. Further these forces are applied alternatively along any of its three coordinate axis. A force of approximately 450–500 grams is necessary to separate the contacts in certain embodiments. Once the separation is initiated the armature is moved with a "snap action" to its new position. It is seen therefrom that a safe, positive acting and positive holding switch having fewer operating members and an inherently longer life is provided with the use of these novel and basic armature arrangements. These and other features of the new means and method of effecting armature operation will become apparent from the following description in which specific switch structures having these novel armature arrangements are set forth.

*Magnetic toggle switch-external shunt actuator*

Whereas the armature actuating means disclosed herein is of a broad scope, the specific features thereof are most ably set forth by the illustration of certain novel switch embodiments utilizing such principle. As pointed out heretofore, the problems of contact deterioration, and shock and vibration resistance are particularly severe in switches which are utilized in free-flight equipment. There has been set forth heretofore manually operated toggle switches which have the contacts enclosed in a hermetically sealed case and which are operated through the agency of an armature which is actuated by the flexing of associated metal or rubber diaphragms or bellows. Such equipment is bulky and space consuming at best and the bellows or diaphragm elements are given to quick fatigue and deterioration. Additionally, a large amount of force used must be expended in overcoming the resistance of the diaphragm or bellows elements to effect actuation of the armature of these devices.

There is therefore a definite need in the aircraft field, for example, for a switch member of the toggle type which eliminates these specific drawbacks and which provides additional features and advantages not heretofore obtainable.

Figure 5:
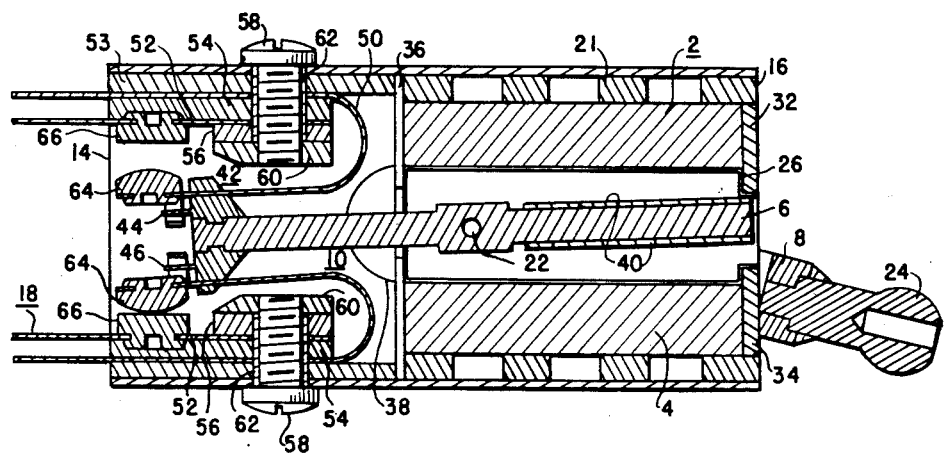
Figure 5 shows a detailed section of the switch of Figure 4.
Figure 6:
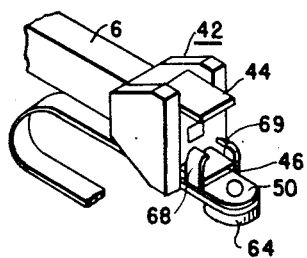
Figure 6 illustrates, in perspective, means for effecting contact actuation by the armature as used in the toggle switch of Figures 4 and 5.

With reference now to Figures 4, 5 and 6 there is shown thereat a magnetic snap-action toggle switch 11 including an armature actuator 8 of the external magnet shunt type. Static field producing members 2 and 4, armature 6 and pileup 10 are enclosed in a housing 12 which comprises a rectangular shaped box formed from a single rectangular blank of stainless steel or other non-magnetic material, the ends of the blank being overlapped and welded on the outer surface to form a solid enclosing unit. Housing 12 may also be formed from seamless tubing in an obvious manner. The ends of the housing 10 may be left open, or alternatively may be enclosed by headers 14 and 16 respectively, the latter made of a non-magnetic material. Terminal members 18 protrude outwardly of the header member 14 at the pileup end of housing 12 for connection to the external electrical circuits which are to be controlled by the switch.

External shunt actuator 8 comprises a U-shaped member of magnetic material, the legs of which are pivoted at the approximate balance point of the handle so that the legs extend along the exterior sides of housing 12 and the base may be pivoted by movement of the handle to positions of rest adjacent the top and bottom of the housing end. A small handle 24 is riveted to the actuator 8 to facilitate movement thereof nad in the interests of a balanced structure the weight added to the base by the handle 24 is compensated for by locating the pivot axis for the actuator closer to the base end. A further compensation is effected by shaving the outer edges of the actuator 20 at the base and leg joining points. Accurate balancing of this type provides a structure which exhibits a greater degree of resistance to shock and acceleration forces as applied thereto.

The static magnetic fields for switch armature 6 are provided by a first permanent magnet 2, which in one embodiment was of Alnico No. 5 material, and a second permanent magnet 4 which is of the same material. The magnets 2 and 4 are respectively mounted on the top and bottom walls of the housing, the magnets being maintained in spaced relation from the top and bottom walls of the housing in Figure 5 by suitable non-magnetic shims 21. The shims are not essential to the invention, the primary purpose thereof being to provide an adjustable filler area whcih may be varied in the event magnets of different characteristics are used. A pair of non-magnetic wedges, such as shown at 26, are spot welded to each side of the case to maintain magnets 2 and 4 in their wall adjoining position and to prevent relative movement thereof toward each other. Wedge 26 also serves to reduce sideway motion of the armature member 6 in its operation.

A pair of magnetic pole pieces 32 and 34 are mounted in abutting relation to the outward ends of the upper and lower magnet members 2 and 4 respectively. Wedge members 26 are notched at their outward end to receive the pole piece members 32 and 34 and thus form a supporting surface therefor.

A pair of compartments are formed in housing 12 by a separator member 36 which has outer dimensions which conform to the interior dimensions of the housing so as to fit snugly therein. A pair of ear tabs, such as 38, are bent at 90° to the compartment separating surface of separator 36 so as to abut the sides of the housing 12 when inserted therewithin. Ear tabs 38 are welded to the housing sides to form a fixed support which prevents rearward movement of the magnet members 2 and 4. Separator member 36 is apertured at its center to permit extension of the armature 6 rearwardly therethrough to the pileup compartment.

Magnet pieces 2 and 4 as inserted into the housing have their inward ends disposed in abutting relation with the surface of the separator member 36 and their outward ends in abutting relation with the pole pieces 32 and 34. The pole pieces in turn abut header 16, and it is apparent therefrom that the magnets 2 and 4, and pole pieces 32 and 34 are securely held in given positions and that a given fixed relation of the elements is maintained at all times. Further, such relation is provided without resorting to the use of screws or other similar fastening means. If the ends of the housing 12 are to be left open, the sides of the housing may be crimped to fix the pole pieces and magnets in the same fixed relative positions.

Armature member 6 is pivotally mounted on a phosphor bronze axle 22 for operation into stable positions of rest adjacent the alternative magnet pole pieces 32 and 34, the pole pieces being disposed in working relation with the outer end of armature 6. Axle 22 in the present embodiment extends through the sides of the housing 12 so as to also form a bearing axle for the magnetic shunt member 8 and the end of axle 22 is tapped with a center punch to prevent slipping thereof through the bearing hole in the magnetic shunt member 8.

Armature 6 comprises a substantially rectangular member of No. 4750 Alleghany metal, the center portion of which is slightly enlarged to provide a stronger supporting section for the axle receiving aperture which is located thereat, and adds adequate flux carrying cross section. Residual plates 40 of a non-magnetic material may be fastened to the pole engaging faces of armature 6 to prevent actual contact of the armature with the pole faces. The residual members also provide suitable means for varying the effective holding force of the static fields.

A spring actuator member 42 is attached to the inward end of armature 6 by means of a rivet or other suitable fastening means. With particular reference to Figure 6, spring actuator 42 comprises a member of insulating material having an H-shaped cross section from which two tab members 44 and 46 extend forwardly for cooperation with the several contact springs of the switch pileup 10.

The switch of Figure 5 illustrates a pair of pileup assemblies 10, the switch being of the double throw-double pole type, it being apparent that modification of the pileup to a single pole, double throw switch may be effected by wiring the lever springs common to a single transfer type contact. Each pileup 10 comprises a pair of contact bearing springs 50 and 52 which are mounted in a given predisposed relation for contact making and breaking movement wtih actuation of the armature member 6 between its given stable positions. With particular reference to Figure 5, each pileup includes a long contact biasing spring 50 and a short contact spring 52 which are separated from each other and housing 12 by suitable insulator members 53, 54 and 56, and which are held assembled in a given relation by screw members 58 which extend through the housing top and bottom respectively, the members of the pileup and associate binder plates 60. Screw member 58 is insulated from each member of the pileup by an insulating bushing 62.

Insulator members 53, which lie against the sides of the can and abut the compartment separating member 36 form base supports for the long contact springs 50, each of which is arcuately bent at its inward end to form a free cantilever-like portion which extends backward in spaced, coextensive relation with approximately one-half its base length. An oval faced contact 64 of suitably rated current carrying material is riveted to the free end of spring 50 on the side facing its own base and a shock resistor spring 68 is fastened to the opposite face of the long spring 50 by the same rivet.

Shock resistor spring 68 comprises a flat base portion having two upwardly extending prongs 69, the free ends of which are bent inwardly in overhanging relation to the tabs 44 and 46 on spring actuator 42 when the spring is mounted in coextensive relation with the contact spring 50.

The second pileup insulator 54 electrically isolates the long contact spring 50 from the short contact spring 52 and maintains the two in a given predisposed relation. Short contact spring 52 has a flat faced contact member 66 riveted thereto and is located in working engagement with the contact member 64 of the long contact spring 50. Insulator member 56 separates the short contact bearing spring 52 from the binder plate 60.

The outwardly extending ends of the springs 50 and 52 serve as terminals 18 to which the current carrying conductors to be controlled may be conveniently attached.

ASSEMBLY

A maximum energy working force for holding and moving the armature 6 is obtained by magnetizing all parts, except the spring arrangements in pileup assemblies 10, after all of the members have been assembled and located within the housing unit 12. Inasmuch as the armature 6, pole pieces 32 and 34 and the external actuator 8 are all part of the magnetic working circuit, their presence during the magnetization is essential to safekeep the high energy content which the switch shall desirably incorporate. This energy product is essentially a function of the B—H (magnetic flux density and magnetomotive force) characteristic of the permanent magnet material used, the magnets 2 and 4 assuming this energy working point after magnetization in accordance with the air gaps that exist after the magnetizing forces are removed. If the magnets 2 and 4 are subjected to exterior magnetomotive opposing forces (from either large air gaps or other opposing M. M. F. sources) a decrease in energy content is experienced. It is desirable therefor to provide a magnetic circuit which maintains a maximum B (flux density) and H (M. M. F.) product characteristic and one preferred method of assembly for accomplishing this object is set forth hereat, it being understood that many other suitable methods may be utilized in providing the aforedescribed ends.

With the magnet pole pieces 32 and 34 and armature 6 mounted within the housing 12 in their appropriate fixed spaced relation, soft iron pieces for providing magnetic connection with the magnetizing source are placed against the inward ends of the magnets 2 and 4 and the pole pieces 32 and 34. The soft iron pieces should be larger in cross section than the ends of magnets 2 and 4 and of a size which will fit into the housing end. A magnetizer unit is then energized to provide magnetic saturation for the switch assembly. Magnetic saturation for a switch of the type set forth in Figures 4, 5 and 6, and having the exemplary values set forth hereinafter, has been effected with the application of a magnetomotive force, of a value recommended by the magnet manufacturers, through the soft iron members and permanent magnets.

While the magnetizing circuit is maintained, the switch actuator 8 should be assembled on the housing 12 whereby the magnets 2 and 4 will not be subjected to an air gap which is larger than that experienced during operation. This particular step in assembly should be carefully accomplished and, if necessary, special assembly keepers should be employed to cancel air gaps while the actuator 8 is being assembled into place. Thereafter the assembly of the remaining elements of the switch may be accomplished in any convenient and obvious manner.

Switch operation

Armature 6 of the switch illustrated in Figures 4, 5 and 6 is operable between two stable positions; that is, a first position in which the pole piece end of armature 6 engages the upper pole piece 32 and the pileup end of armature 6 effects the closing of contacts 64 and 66 of the lower pileup and the opening of the contacts 64 and 66 of the upper pileup; and a second position in which the pole piece end of armature 6 engages lower pole piece 34 and the pileup end of armature 6 effects the closing of contacts 64 and 66 of the upper pileup and the opening of contacts 64 and 66 in the lower pileup.

Movement of armature 6 between the two positions in the embodiment shown in Figures 4, 5 and 6 is effected by means of a magnetic shunt actuator 8 which is movable between a first position adjacent the lower pole piece 34 and a second position adjacent the upper pole piece 32. In that shunt actuator 8 is substantially centrally pivoted about axle 22, the legs of the actuator diagonally bisect the side of the housing in either of its positions in an obvious manner. Actuator 6 is pivotally mounted so that the motion thereof is limited in each direction by contact of the base portions with the housing end adjacent the pole pieces 32 and 34.

With the actuator in the stable position illustrated in Figure 5, armature 6 will assume an opposing position as there shown to operate contacts 64 and 66 of the upper pileup to the open condition and contacts 64 and 66 of the lower pileup to the closed position. It is apparent that with the armature 6 in this stable position, the cantilever end of spring 50 in the lower pileup assembly is urged downwardly by spring actuator 42 to bring the oval faced contact 64 thereon into engagement with the flat-faced contact 66 on the short contact spring 52. The tabs on spring actuator 44 and the natural releasing of the free end of long contact spring 50 in the upper pileup will cause same to remain out of contact-making relation with short spring member 52 thereat.

With movement of the actuator 8 from its stable position adjacent pole piece 34 to its stable position adjacent pole piece 32, armature 6 is moved from its position adjacent pole piece 32 to its position adjacent pole piece 34.

Such movement is effected at a predetermined point in the traverse of the actuator 8 to its new position even though the armature 6 is not mechanically attached to the actuator 8. Further the movement is effected abruptly and with a desirable high speed snap action. Spring actuator 42 mounted on armature member 6 thereupon effects the opening of contacts 64 and 66 in the lower pileup assembly and the closing of the contacts 64 and 66 in the upper pileup assembly.

The inherent resiliency of spring 50 in the lower pileup as aided by tab 46 on the shock resistor spring 42 tends to separate contacts 64 and 66 of the lower pileup, it being noted that taps 46 are formed to provide a degree of play whereby the armature 6 may operate through a large excursion and attain a degree of speed and momentum before engaging the tabs 46. As the spring actuator 42 moves with the armature a shearing separating force is exerted on the contacts and a great degree of protection against contact welding and sticking is provided thereby. The wiping action effected with spring straightening upon release of the armature pressure also aids in the reduction of possible contact sticking.

As armature 6 moves toward the upper pileup, spring actuator 42 engages contact 50 to move contacts 64 and 66 of the upper pileup into circuit closing relation. Following closing of the contacts, the cantilever bend of the spring permits a degree of armature override with a consequent sharp increase in contact pressure. As a result the possibility of contact bounce is extremely minimized and a shock and vibration resisting arrangement is effected. Armature 6 and actuator 8 are firmly held in their new positions under the magnetic influence of the adjacent pole pieces 32 and 34, and remain so held until they are purposely transferred by interference with their magnetic holding fields. That is, with reference to Figure 5, it is apparent that the magnetic actuator 8 in a given position effectively shunts the magnet 2 or 4 to which it is adjacent by providing a high permeability return path for the flux emanating from the associated pole piece 2 or 4. The shunt is so effective that very little flux from the magnet thus shunted will thread the armature member 6 and no adverse rotational torques of a noticeable value are experienced. Additionally, the flux from the magnet member which the magnetic shunt actuator 8 is adjacent holds the shunt actuator 8 firmly in its given position.

Armature 6 likewise provides a high permeability return path for flux emanating from its adjacent pole piece and the armature 6 is firmly held in its given position.

In the operation of the magnetic shunt actuator 8 from one of the stable positions to the other, the flux distribution alters so that more flux from the particular magnet which the actuator 8 was previously resting against will now thread the armature 6, while simultaneously the flux which previously threaded the armature 6 from the magnet adjacent thereto is now reduced by the fact that the magnetic shunt actuator 8 is providing a lower permeability return path for the flux emanating from the magnet end adjacent the armature 6.

As the magnet shunt actuator 8 approaches the pole piece which the armature 6 is adjacent, the flux distribution is shifted to the point where the opposite magnet exerts a greater tractive force on the armature than the adjacent magnet and a very speedy transfer of the armature from its adjacent pole piece to the opposite pole piece is effected, a snap-action movement resulting because of the greater than linear build-up of actuating force on the armature 6 for each progressive increment of its motion towards the other magnet.

It is apparent that extremely strong holding forces are effected by the magnetic paths to maintain the armature 6 and the switch actuator 8 in the positions to which they are moved. In an embodiment built to the specifications appearing hereinafter, a force in the order of 450–500 grams was necessarily applied to separate the contacts.

Dimensions for the housing 12 of a commercial type switch were in the order of 1.75" long, .375" wide, and .75" high. Magnet members 2 and 4 were made of Alnico No. 5 material and were approximately .880" long, 0.175" high and .375" wide. Pole pieces 32 and 34 which were utilized therewith were approximately .375" wide .209" high and .062" thick.

Armature member 6 which is of No. 4750 Alleghany metal is approximately 1.418" long, .330" in width, and .093" thick for the major portion of its length. Armature residuals 40 mounted on the faces of the armature pole piece ends are approximately .003" thick and extend backward along the armature approximately ⅝ of an inch. The spacing of the air gap space between a pole piece and the armature as it lies adjacent the opposite pole piece is approximately .0625 inch. The lever arm of the armature which the effective pole piece acts through is approximately .737". The switch is tested for breakdown at 1000 volts A. C. between the contact springs and the springs to housing.

Average contact opening speed is about 30 inches per second, but obvious modifications of the switch may be effected to provide slower speeds of operation as necessary. Contact separation is approximately .090" and the contact travel time is between 2 and 4 milliseconds, which is of an extremely high order for contact separation.

Certain methods for modifying the motion of the magnetic actuator prior to operation of the armature (commonly identified as pre-travel) include:

(a) Varying the air gap including the total armature travel and the influence of the non-magnetic shims such as 40;

(b) Varying the clearance between the magnetic actuator 8 and the pole pieces 32 and 34;

(c) Varying the contact lever spring pressures which must be overcome by the armature 6 in forcing the contacts 62 and 64 closed.

Motion of the magnetic actuator subsequent to the operation of the armature (commonly known as over-travel) is usually determined by the pretravel value inasmuch as for best operation of the switch the magnetic actuator 8 comes to rest over a pole piece whereby its motion is restrained by the magnetic attraction exerted by such pole piece.

The dynamic balance of the moving parts of the switch shown in Figures 3, 4 and 5 is achieved by providing equal moments along the three axis about the center of axial mounting 22. Distribution of moments in this manner plus the great attractive force of the pole piece holding the armature 6 affords a high measure of shock and vibration resistance.

Magnet members 2 and 4 as mounted in the illustrated arrangement both present north poles to the base of the actuator 8. The magnets may, of course, be turned so that both present a south pole thereto. Also one of the magnets may be turned so that it presents a south pole to the actuator base and the other magnet presents a north pole thereto, the external shunt arrangement of this switch being operative to effect armature transfer in any of the arrangements.

Hermetically sealed toggle switch

A snap-action toggle switch 111, including the novel armature actuator means of the invention and which is especially adapted for convenient hermetic sealing, is set forth in Figures 7, 8 and 9. The basic structure of the snap-action switch there shown as somewhat similar to the switch structures set forth in Figures 4, 5 and 6, and like parts are therefore identified by like numbers in the one hundred series.

The housing now identified as 112 preferably comprises a seamless case which may be formed from seamless tubing material in an obvious manner. Headers 114 and 116 enclose the housing ends and are silver soldered thereto to provide a tightly sealed enclosure for the switch elements which are mounted therein. Terminal members 118 comprise cylindrical pin members arranged to extend outwardly of the housing through glass bead supports such as 115.

Magnets 102 and 104 and pole pieces 132 and 134 are held in their spaced positions by the spacer member 126, separator 136 and header 116. The armature axle member 123 which extends through the armature is recessed in the hub members 125, which are located on the opposite sides of the housing 112. The hub members 125 are hermetically sealed to the housing side with silver solder, a central cavity 127 being also filled with silver solder. Actuator 108 is provided with pivot sockets which are dimensioned to fit the hub members 125 for pivotal rotation thereabout. Actuator 108 is assembled on the switch, by "bump" springing its sides into close alignment with the sides of housing 112, and allowing the actuator sockets to engage the hubs 125.

A modified pileup assembly 110 and spring actuator 142 for use with the hermetically sealed switch are shown in Figs. 7 and 8. Spring actuator 142 comprises a ceramic insulating block which is attached to armature 106 and to a contact bearing spring 153 by rivets 155 or other suitable fastening means. Spring 153 at its terminal end mounts four oval faced contact members 157 for engaging alternatively the inward ends of the upper pair or lower pair of terminals 118 to effect the desired circuit controlling operations thereat. Movement of the armature 106, spring actuator 142 and contacts 157 between the alternate circuit controlling positions is effected by movement of the actuator 108 in the manner set forth for the first switch 11.

External permanent magnet actuator

Other novel methods and means for effecting armature actuation are set forth in Figures 2 and 3, the manner of incorporating same in a switch member being obvious from the foregoing disclosures.

In the arrangement shown in Figure 2, an armature 6a is pivotally mounted between two permanent magnets 2a and 4a respectively, and is moved between two stable positions by an actuator 8a. The magnets 2a and 4a in the disclosed arrangement are mounted with the poles in conforming relation. The actuator 8a comprises an external permanent magnet 7a which is pivotally mounted upon a support 9a located outwardly of the magnet and armature assembly. The external magnet actuator 8a is mounted so as to be operative in one of its positions to present one of its poles to the end of the upper magnet 2a and in the other position to present that pole to the lower magnet 4a. In the arrangement of Fig. 2, the external magnet actuator 7a is illustrated as presenting its south pole alternatively to the north pole of the upper magnet 2a or the lower magnet 4a. A more favorable flux path is provided by tapering the working edge of the external permanent magnet actuator 9a as shown, whereby a substantially flat face is presented to each magnet end as it is moved adjacent thereto. Residual members 40 may be attached to the outward end of the armature to prevent direct contact thereof with the magnets 2a and 4a as before. An alternative mounting for the armature comprises the location of the pivot at the extreme inward end of the armature as shown in Fig. 2.

With the external magnet actuator 8a in the position shown in Figure 2 the pole strength of lower magnet 4a is substantially cancelled by reason of the proximity of the adjacent south pole on the permanent magnet actuator 7a. As a result, very little flux from the magnet 4a will thread the armature 6a and the actuator 7a will be firmly held in its given position. Armature 6a in turn provides a high permeability return path for flux emanating from the upper magnet 2a whereby it is held firmly adjacent thereto.

As the permanent magnet actuator 7a is moved to its other position, that is with the south pole in adjacent relation to the north pole of the upper magnet 2a, the flux distribution alters so that more and more flux from the lower magnet 4a threads the armature 6a while simultaneously the flux threading the armature 6a from the upper magnet 2a is reduced by the fact that the permanent magnet 8a is substantially reducing the pole strength of the upper magnet 2a. As the permanent magnet actuator 7a approaches the upper magnet 2a the flux distribution is shifted to the point where the lower magnet 4a exerts a greater tractive force on the armature 6a than the upper magnet 2a and a very speedy transfer of the armature from its upper position to its lower position is effected, such movement being of a snap action nature due to the greater than linear buildup of actuating force on the armature for each progressive increment of its motion towards its other stable position.

*External electro-magnetic actuator*

A further novel method of and means for effecting armature actuation is set forth in Figure 3, the arrangement being similar to that shown in Figure 2 and utilizing in lieu of the external permanent magnet actuator 7a shown thereat, an electromagnet actuator 7b. A coil member 5b which is arranged to be connected to a suitable energizing source is wound about a bar member, preferably of a soft iron material, having the working end thereof tapered so as to present a flat surface to each of the magnet ends. The coil is wound so that with energization the tapered end becomes a south pole. Thus, with movement of the actuator as energized to its positions adjacent the magnet ends, the operation and actuation of the armature 6b to its alternative position will be effected in the manner of the external permanent magnet actuator 7a.

It is noted that the armature will be held in either of its positions, even though the actuator coil is deenergized because of the presence of the static field faces. Further it is obvious that movement of the electromagnetic actuator 7b (or any of the other actuators 7a or 7b) may be effected by other mechanical or electrically operated means. The magnets 2a, 2b, 4a and 4b are shown as presenting north poles to a south pole on the actuators 7a and 7b. It is apparent that the magnets could present south poles to the north pole of the actuator. Also, one magnet could present a north pole and the other a south pole, in which case the actuator would be mounted to present its south pole to the one magnet and a north pole to the other magnet when structure actuation is desired.

*Cylindrical switch magnet*

A species of the switch utilizing the novel armature actuating principle of Fig. 1 is illustrated in Figs. 10 and 11 and as there shown comprises a twist key type switch having an outer rotatable cylindrical housing unit 160 which is rotatable about an inner armature-magnet assembly. With reference to Fig. 11 the cylindrical housing 160 is comprised of two joined semi-cylindrical sections, one-half of the cylinder 161 being made from stainless steel or other suitable non-magnetic material, and the other half 163 being made of a magnetic material, such as Alleghany metal No. 4750.

A horseshoe magnet 162 having a first north pole 164 and a second north pole 166 and a base 168 which is a south pole is disposed within the cylindrical container 160. A mounting pin 165, extends rearwardly of the magnet and through housing 160 for field attachment to a mounting member.

An armature member 170 is pivotally mounted on an axle member 172 which extends laterally through the armature and a mounting block 171. The outward end of armature 170 is arranged to be moved alternatively to a position adjacent the upper north pole 164 or to a position adjacent the lower north pole 166 of the horseshoe magnet 162.

With reference to Fig. 10, the switch is shown with the non-magnetic portion 161 of the housing 160 removed, the lower portion 163 dotted in and the horseshoe magnet 162 broken away to illustrate the mounting of the armature 170 more clearly.

With the housing in the position shown in Fig. 10, that is with the magnetic portion of the housing 163 in adjacent relation to the lower north pole 166 of the horseshoe magnet 162, the magnetic material of the lower housing half 163 effectively shunts the lower magnet portion by providing a high permeability return path for flux emanating therefrom. The flux emanating from the lower magnet 166 firmly holds the outer cylindrical housing in its assumed position.

Similarly a high permeability return path for flux emanating from the upper magnet section 164 is provided by the armature 170 as it lies adjacent thereto, and the armature is firmly held thereat.

As the magnetic shunt portion 163 of the outer housing 160 is rotated to move the shunt away from the lower magnet section 166 and toward the upper magnet section 164, the flux distribution alters so that more and more flux from the lower magnet section 166 threads the armature 170, while simultaneously the flux threading the armature 170 from the upper magnet section 164 is reduced by the fact that the magnetic shunt portion 163 of the housing is providing a lower permeability return path for the flux emanating from the upper magnet section 164. As the magnetic shunt actuator portion 163 approaches the upper magnet section 164, the flux distribution is shifted to the point where the lower magnet section 166 exerts a greater tractive force on the armature 170 than the upper magnet section 164 and a speedy transfer of the armature 170 from the upper to the lower position is effected in a snap action manner.

Contact pileup assemblies may be added to the switch in several obvious manners, as for example by placing an aperture in the base 168 of the magnet to permit extension of the armature and therethrough for working engagement with a pileup mounted rearwardly of the magnet.

*Conclusions*

There has been set heretofore new and novel magnetically-actuated armature arrangements which are basic in the provision of more positive-acting, shock resisting switch structures. The static magnetic fields which are integral therewith provide extremely stable armature positions whereby possible opening of the contacts with the application of excessive shock and acceleration forces is substantially minimized. The additional use of the armature holding fields to effect armature movement as well provides an arrangement in which a maximum of desirable operating features are provided in a minimum of space.

The novel operating structure wherein an external actuator physically unattached to the armature is operative to modify the field geometrys of the static field producing means and thereby effect armature actuation lends the structure to convenient use in hermetically sealed switches and provides a practical solution for the many field problems which existed heretofore.

The novel armature actuating means makes possible the provision of new and novel switch members of exceptional operating characteristic which are particularly well exemplified by the several species set forth hereinbefore. Other improved and desirable switch members in operating this basic structure are to be found in the mentioned copending application. While there is illustrated herewith the preferred embodiments of the invention, it nevertheless shoud be understood that modifications and rearrangements may be made therein without departing from the essence of the invention.

What is claimed is:

1. A switch member for controlling associated electrical circuits comprising a first static field producing means and a second field producing means mounted in a given spaced relation, an armature member pivotally mounted between said spaced field producing means for alternative movement to first and second positions adjacent said first and second field producing means, a housing for encompassing said field and armature arrangement, one half of said housing being comprised of a non-magnetic material and the other half of said housing being comprised of a magnetic material, and means supporting said housing for movement about said field and armature arrangement to bring said magnetic half into adjacent relation alternatively with said first or said second field producing means.

2. A switch member for controlling associated electrical circuits comprising a first static field producing means and a second field producing means mounted in a given spaced relation, an armature member pivotally mounted between said spaced field producing means for movement to positions adjacent alternative ones of said field producing means, a cylindrical housing for encompassing said field and armature arrangement, one half of said cylinder being comprised of a non-magnetic material and the other half of said cylinder being comprised of a magnetic material, and means supporting said two section housing for rotation about said field and armature arrangement to bring said magnetic cylinder half into adjacent relation alternatively with said first and said second field producing means, said armature being operative to its position adjacent the field opposite that which is abutted by said magnetic half cylinder, and a contact pileup assembly mounted for operation with movement of said armature between its two positions.

3. A switch member for controlling associated electrical circuits comprising a horseshoe magnet means having a pair of spaced arms for providing a first and second force producing field of like polarity, an armature member pivotally mounted in said space between said field producing means for movement to positions adjacent alternative ones of said arms, and an actuator member of magnetic material mounted for movement adjacent alternative ones of said magnet arms to control movement of said armature between its two positions.

4. Control means comprising an armature member having at least a common portion thereof movable between several given positions, static magnetic force producing means at each position operative to apply a holding force to said common portion of the armature at such position as moved thereto, and being of a value sufficient to independently move the armature to its associated position whenever the force holding the armature at another position is substantially reduced, and actuator means operative to shunt the holding forces for the armature at each position as moved thereto to permit snap action attraction of said common armature portion by the static force producing means at a different position, the static magnetic force means at each position being of a value to maintain the actuator stable as moved adjacent thereto.

5. In combination a housing containing an armature and static field producing means mounted at least at a first and a second position for holding the armature at a position as moved thereto, the static field producing means at each position being operative to attract the armature thereto from a different position whenever the forces of the static means which hold the armature at such different position are substantially minimized, and actuator means external to said housing operable as moved to a position to shunt the static forces applied to the armature at such position to effect release of the armature and simultaneously to remove the shunt from the field at a different position to permit attraction of the armature to the different position in a snap action manner, and actuator means being operative to complete a path at each position including the actuator means and the adjacent field producing means for maintaining the actuator stable thereat.

6. A switch member including armature means for actuating associated contact members in circuit controlling operations comprising a housing, a pivotally-mounted armature member movable to displace an end thereof between two given positions, a first permanent magnet having one of its poles supported adjacent one of said positions to maintain the armature stable in its movement thereto, a second permanent magnet having one of its poles supported adjacent the second one of said positions to maintain the armature stable in its movement thereto, said support means for said magnet and pole pieces comprising a pair of wedge plates for urging said magnets apart and into contact with opposite walls of said housing, a pair of end plates for preventing outward movement of said magnets; and an actuator member supported outside said housing mechanically independent of the armature to operate between said two positions and in its movement to a position to shunt the effective force holding said armature at that position and to simultaneously remove the shunt for the forces of the magnet at the other of said positions relative to the armature to thereby effect the snap action movement of said armature to the other position.

7. A switch as set forth in claim 6 in which said armature member and said actuator member are mounted on a common axis in a dynamically and statically balanced manner.

8. A switch member for controlling associated electrical circuits comprising a housing, a first permanent magnet for providing a first magnetic field at a first position, a second permanent magnet for providing a second magnetic field at a second position, an interspace having said first and second permanent magnets as two boundaries thereof, an armature member mounted within the housing with a portion thereof located in said interspace common to both of said fields, said permanent magnets each being of a force sufficient to maintain said armature stable as moved to its associated position and to independently attract the armature from another position when the holding forces at the other position are removed, and actuator means movable between said positions for effecting movement of the armature between its two positions, said actuator means being operative as moved to a position to shunt the magnetic field holding the armature in such position, and simultaneously to remove the shunt for the second magnetic field relative to the armature so to permit same to attract the armature to the second position.

9. An arrangement as set forth in claim 8 which includes a contact pileup assembly comprising at least one pair of contact bearing springs, one of said springs being substantially fixedly mounted and the other of said springs being mounted as a cantilever to effect movement of its contact into and out of engagement with the contact on the other spring responsive to movement of the armature member between said first and second positions.

10. An arrangement as set forth in claim 8 which includes a contact pileup and a spring actuator member mounted on said armature for operating the contacts of said pileup with the movement thereof, and in which said pileup comprises at least one pair of contact bearing springs, one of said springs being substantially fixedly mounted and the other of said springs being mounted as a cantilever with its contacts disposed thereon for movement into and out of engagement with the contact on the other spring, and armature engaging members disposed on said cantilever contact bearing spring for engagement by said armature spring actuator only after a given distance of travel has been accomplished by said armature in its movement to a new position.

11. A switch member for controlling associated electrical circuits comprising a first permanent magnet member mounted with one of its poles at a first given position and a second permanent magnet member mounted in spaced relation to said first permanent magnet member with one of its poles at a second given position which is spaced in juxtaposed relation with said pole at said first position, an interspace having said first and second permanent magnet members as two boundaries thereof, an armature member of a magnetic, non-permanent magnet-type material pivotally mounted in said interspace for movement of a portion thereof adjacent alternatively said first and second positions, and an actuator of a high permeability material for providing a preferred path for the flux of a magnet pole at a position as the actuator is moved thereto to decrease the effect of such magnet on said armature, and to simultaneously increase the effect of the field of the magnet at the other position to effect snap action attraction of the armature thereto.

12. Control means for controlling the movement of associated equipment comprising an armature member having at least a portion thereof movable between several given positions, static magnetic force producing means at each position which are operative to hold the armature at its associated position as moved thereto and which are operative to independently move the armature to its associated position whenever the force holding the armature at another position is substantially reduced, and actuator means comprising a permanent magnet member operative to provide a path of higher permeability for the holding force for the armature at each position as the actuator is moved thereto, and operative to simultaneously increase the forces exerted on said armature by the force producing means at another position to thereby effect attraction of the armature to said other position with a snap action movement.

13. Control means for controlling the movement of associated equipment comprising an armature member having at least a portion thereof movable between several given positions, static magnetic force producing means at each position which are operative to hold the armature at its associated position as moved thereto, and which are operative to independently move the armature to its associated position whenever the force holding the armature at another position is substantially reduced, and actuator means comprising an electromagnetic magnet member operative to provide a path of higher permeability for the holding force for the armature at each position as the actuator is moved thereto, and operative to simultaneously increase the forces exerted on said armature by the force producing means at another position to effect independent attraction of the armature thereby to said other position with a snap action movement.

14. A switch member for controlling associated electrical components comprising a first permanent magnet member mounted with one of its poles disposed to define a first position, a second permanent magnet member mounted in parallel spaced relation with said first magnet, one of the poles of the second magnet being disposed to define a second position spaced from said first position, an armature member having at least a portion thereof disposed in the space between said magnets with a common portion influenced by said poles, and a U-shaped actuator pivotally mounted with the legs thereof arranged to extend adjacent the sides of said first and second magnets with the base of the U-shaped actuator alternatively movable adjacent said pole of the first magnet and said pole of the second magnet.

References Cited in the file of this patent

UNITED STATES PATENTS

| | | |
|---|---|---|
| 266,750 | Bergmann | Oct. 31, 1882 |
| 692,579 | Wotton | Feb. 4, 1902 |
| 1,879,612 | Hudd | Sept. 27, 1932 |
| 1,891,568 | Morris et al. | Dec. 20, 1932 |
| 2,086,754 | Werner et al. | July 13, 1937 |
| 2,185,460 | Harris | Jan. 2, 1940 |
| 2,323,910 | Hubbell | July 13, 1943 |
| 2,463,426 | Ressler et al. | Mar. 1, 1949 |
| 2,475,819 | Coake | July 12, 1949 |
| 2,490,280 | Rees | Dec. 6, 1949 |
| 2,521,723 | Hubbell | Sept. 12, 1950 |
| 2,632,820 | Gauvreau | Mar. 24, 1953 |

FOREIGN PATENTS

| | | |
|---|---|---|
| 107,177 | Australia | Apr. 12, 1938 |
| 119,909 | Australia | Oct. 6, 1943 |
| 549,844 | Great Britain | Oct. 10, 1941 |